Patented Dec. 5, 1922.

1,437,758

UNITED STATES PATENT OFFICE.

CARL JAGERSPACHER, OF BASEL, SWITZERLAND, ASSIGNOR TO SOCIETY OF CHEMICAL INDUSTRY IN BASLE, OF BASEL, SWITZERLAND.

DYESTUFFS PARTICULARLY ADAPTED FOR CALICO PRINTING.

No Drawing.   Application filed March 4, 1922.   Serial No. 541,210.

*To all whom it may concern:*

Be it known that I, CARL JAGERSPACHER, a citizen of the Swiss Republic, and resident of Basel, Switzerland, have invented new and useful Dyestuffs Particularly Adapted for Calico Printing, of which the following is a full, clear, and exact specification.

I have found that by combining the diazo compounds derived from 1-amino-2-oxy-naphthalene-4-sulfonic acid with a resorcylic acid there are obtained new monoazodyestuffs corresponding to the general formula

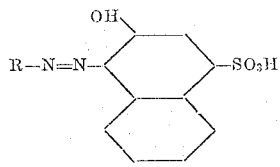

wherein R stands for the radical of a resorcylic acid and wherein the naphthalene nucleus can still bear other substituents. In a dry state, these dyestuffs are deep-dark powders dissolving in water containing sodium carbonate and in concentrated sulfuric acid with violet-red to violet colorations. Printed on cotton with the aid of chromium salts, they give violetish blue to violetish brown tints of excellent fastness to soaping and to light.

The invention is illustrated by the following examples.

Example 1.

The diazo compound derived from 23.9 parts of 1-amino-2-oxynaphthalene-4-sulfonic acid is introduced into a concentrated aqueous solution of 15.4 parts of a resorcylic acid and 30 parts of sodium carbonate. Thereafter 40 parts of 30% sodium hydroxide solution are added. When the diazo compound has disappeared, the very soluble dyestuff is precipitated by acidifying with a mineral acid, pressed and dried. It constitutes a deep-dark powder which dissolves in water to a red-brown solution. By adding sodium carbonate the coloration of this solution turns to violet. The new dyestuff dissolves also in concentrated sulfuric acid to a violet solution. It yields in calico printing with chromium salts violetish blue tints of excellent fastness to soap and to light.

Example 2.

15.4 parts of a resorcylic acid are introduced into a mixture of 7 parts of magnesia and 40 parts of water. The whole is well stirred, then there is introduced in the mass a well neutralized paste of 29.4 parts of the nitro derivative of the 1-diazo-2-oxynaphthalene-4-sulfonic acid. When the combination is achieved, the dyestuff is precipitated by acidifying with a mineral acid, filtered off and dried. It constitutes a black powder dissolving in water with a red-brown coloration. By addition of sodium carbonate this coloration turns to a violetish red. In concentrated sulfuric acid the new dyestuff dissolves with a beautiful violetish red coloration. Printed on cotton with chromium salts it yields violetish brown tints of excellent fastness to light.

What I claim is:—

The herein described new dyestuffs resulting from the action of the diazo derivatives of the 1-amino-2-oxynaphthalene-4-sulfonic acid on a resorcylic acid, corresponding to the formula

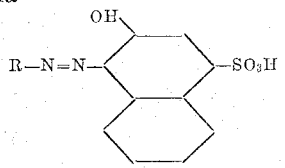

wherein R stands for the radical of the resorcylic acid, whilst the naphthalene nucleus may contain further substituents, the said dyestuffs being deep-dark powders dissolving in water containing sodium carbonate and in concentrated sulfuric acid with violet-red to violet colorations and yielding, when printed on cotton with chromium salts, violetish blue to violetish brown (purple) tints of excellent fastness, to soaping and to light.

In witness whereof I have hereunto signed my name this 14th day of February 1922, in the presence of two subscribing witnesses.

CARL JAGERSPACHER.

Witnesses:
 FRIDA KURZ,
 AMSUR BRAUN.